United States Patent
Clark et al.

(10) Patent No.: US 7,462,281 B2
(45) Date of Patent: Dec. 9, 2008

(54) PORTABLE TANK APPARATUS AND METHOD OF USE

(75) Inventors: Glenn Clark, 45 Horobin, Fallriver, Nova Scotia (CA) B2T 1E6; Colin Morrell, 2086 Maynard Street, Halifax, Nova Scotia (CA) B2K 3T4

(73) Assignees: Glenn Clark, Fallriver, Nova Scotia (CA); Colin Morrell, Halifax, Nova Scotia (CA)

( * ) Notice: Subject to any disclaimer, the term of this patent is extended or adjusted under 35 U.S.C. 154(b) by 0 days.

(21) Appl. No.: 11/973,186

(22) Filed: Oct. 5, 2007

(65) Prior Publication Data

US 2008/0041778 A1 Feb. 21, 2008

Related U.S. Application Data

(62) Division of application No. 11/052,683, filed on Feb. 7, 2005, now Pat. No. 7,311,827.

(51) Int. Cl.
*B01D 21/06* (2006.01)
(52) U.S. Cl. .................. 210/232; 210/241; 210/528; 220/4.16; 220/4.22; 220/562; 280/830; 280/839; 29/463
(58) Field of Classification Search ............... 210/232, 210/241, 528; 220/562, 4.12, 4.16, 4.21, 220/4.22, 4.23, 4.24; 280/830, 837, 838, 280/839; 29/463
See application file for complete search history.

(56) References Cited

U.S. PATENT DOCUMENTS

| | | | |
|---|---|---|---|
| 1,381,877 A | 6/1921 | Ickes | |
| 2,097,113 A | 10/1937 | Brandley | |
| 3,051,502 A | 8/1962 | Webster | |
| 3,193,847 A | 7/1965 | Mashura | |
| 3,263,811 A | * 8/1966 | Baker et al. | 210/167.19 |
| 3,358,616 A | 12/1967 | Brodhead | |
| 3,426,903 A | 2/1969 | Olecko | |
| 3,727,795 A | 4/1973 | Willsey | |
| 3,951,819 A | 4/1976 | Shaffer et al. | |
| 4,036,390 A | 7/1977 | Morse | |
| 4,223,498 A | 9/1980 | Ventrice | |
| 4,449,724 A | 5/1984 | Ahn | |
| 4,729,828 A | 3/1988 | Miller | |
| 4,860,914 A | 8/1989 | Derni et al. | |
| 5,232,246 A | 8/1993 | Page | |

(Continued)

FOREIGN PATENT DOCUMENTS

WO   WO 99/00170   1/1999

OTHER PUBLICATIONS

Over-Dimensional Moves Nova Scotia Department of Transportation & Public Works, Highway Operations, Policies and Procedures Manual, Procedure No. PR5033, Mar. 5, 2006.

*Primary Examiner*—Christopher Upton
(74) *Attorney, Agent, or Firm*—Seyfarth Shaw LLP

(57) ABSTRACT

A tank assembly comprises a plurality of tank sections. Each tank section is capable of being connected to at least one other tank section. Each tank section is dimensioned to enable the section to be accommodated at or within a predetermined width limit for transportation by public road. A dimension of the tank directed across the sections when the tank is assembled exceeds the predetermined width limit.

15 Claims, 8 Drawing Sheets

U.S. PATENT DOCUMENTS 5,234,286 A     8/1993   Wagner
5,288,414 A *   2/1994   Mongiello ............. 210/167.19

2002/0190519 A1    12/2002   Erickson

* cited by examiner

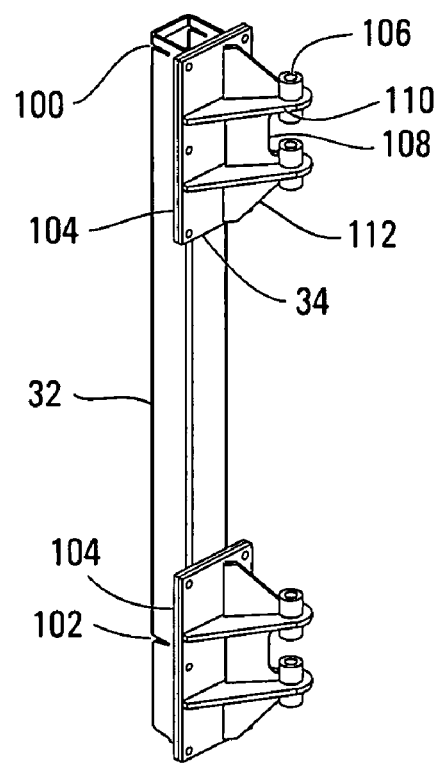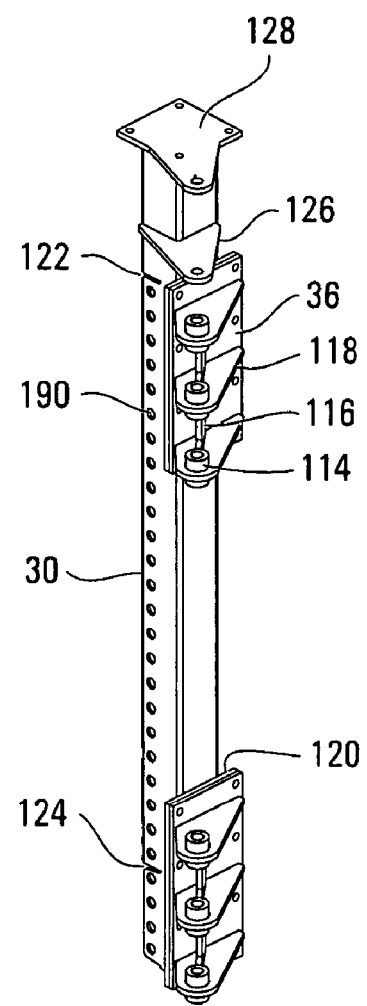
FIG. 4A
FIG. 4B

PORTABLE TANK APPARATUS AND METHOD OF USE

REFERENCE TO RELATED APPLICATION

This application is a division of U.S. application Ser. No. 11/052,683, filed Feb. 7, 2005 now U.S. Pat. No. 7,311,827.

FIELD OF THE INVENTION

This invention relates to portable tanks, in particular, tanks transportable by trailer.

BACKGROUND OF THE INVENTION

A clarifier/thickener tank of a clarifier/thickener system serves two purposes. First, the clarifying aspect of the tank produces liquid clarified of suspended solids. Secondly, the thickener aspect of the tank concentrates the clarified suspended solids to an increased solids percentage.

Most conventional clarifier/thickener tanks have a cylindrical shape. A rectangular shape is sometimes used but is less common because of inefficiencies that can be introduced during clarification from this geometry. The cylindrical form is the most common configuration and efficient in terms of clarifier ability. The performance of the thickener aspect is independent of shape but dependent on the overall depth of the tank which provides weight from the fluid itself and the overlying thickened sludge to dewater or thicken the slurry. A clarifier/thickener tank typically has a funnel shaped bottom with steep sides to assist in removal of the solid slurry. For a conventional clarifier/thickener tank equipped with a sludge removal device such as a rake system, the slope of the bottom is about 1.5 inches for every twelve inches of run. The preferred diameter of a cylindrical clarifier/thickener tank can vary depending on the water flow rate, the density of the slurry, the slurry setting characteristics and other factors.

It is desirable to have a portable clarifier/thickener system so that the system may be transported to locations where the temporary use of the system is desired without the effort and expense of constructing and dismantling a fixed installation at each location the system is utilized. These construction and dismantling activities involve considerable expense from the labor, transportation and crane rental required to complete the installation. These costs become even more significant if the locale of operation is in a remote area or access to the site is intermittent.

The diameter of tanks which can be transported is limited by transportation laws which limit the width of a load which can be transported by road. As transported loads increase beyond a width of 10 to 12 feet, increasingly expensive and restrictive permits require purchase. For example, as load widths increase beyond 14 feet it is common for the permits to require the use of escort vehicles as well as limitations on the routes and times that the load can be transported. (See, for example, Nova Scotia Department of Transportation & Public Works, Highway Operations, Policies and Procedures Manual, Procedure Number PR5033, Mar. 5, 2006.) As a result, the transport limitations place a limit on the clarifying rate of such a system since the clarifying rate of a clarifier/thickener tank is dependent on the square foot surface area of the interior of the tank. To overcome this limitation, multiple smaller tanks can be placed in series. However, this creates complexity in the system from duplication of piping, valves, sludge pumps, feed splitters, etc. Also, the capacity to accumulate and thicken solids depends on the volume of the tank.

SUMMARY OF THE INVENTION

A portable tank is disclosed which allows for rapid and inexpensive mobilization and demobilization of a clarifier/thickener at multiple locations while maintaining a desirable clarification.

According to one broad aspect, the invention provides a tank assembly comprising a plurality of tank sections each capable of being connected to at least one other tank section, wherein each tank section has a dimension that enables the section to be accommodated at or within a predetermined width limit for transportation by public road, and wherein a dimension of the tank directly across the sections when the tank is assembled exceeds said predetermined width limit.

In some embodiments, the tank assembly comprises a bottom and a side wall extending upwardly from said bottom and wherein at least two sections each comprise a portion of said bottom and a portion of said side wall.

In some embodiments, said predetermined width limit is defined as the maximum width for transportation without a permit in the jurisdiction in which said tank is to be transported.

In some embodiments, said dimension of the tank directed across the sections is 11 feet or more.

In some embodiments, each section has opposed edges in which one of said edges is for connection to another tank section and a dimension between said edges is greater than half said predetermined width limit.

In some embodiments, the tank assembly further comprises mounting means for mounting a fluid treatment device therein.

In some embodiments, said tank comprises mounting means for mounting a rotary device therein.

In some embodiments, said rotary device includes a rotor having a diameter which exceeds said predetermined width limit.

In some embodiments, said tank when assembled is substantially cylindrical.

In some embodiments, the plurality of tank sections comprise two substantially uniform semi-cylindrical halves.

In some embodiments, the opposed edges define an open face in a transportation position.

In some embodiments, the at least two tank sections are pivotally attached along the divide.

In some embodiments, at least two tank sections are pivotally attached.

In some embodiments, the tank assembly further comprises at least a portion of at least one of a clarifier and a thickener mounted to said tank assembly.

In some embodiments the tank sections are adapted to together hold liquid when the tank is assembled.

In some embodiments, the tank assembly further comprises a frame and wheels supporting the tank sections.

In some embodiments, the tank assembly further comprises a plurality of retractable downward supports for supporting the assembled tank.

According to one broad aspect the invention provides a tank assembly comprising a plurality of tank sections each capable of being connected to at least one other tank section and a fluid treatment apparatus capable of being mounted within the tank assembly when the tank assembly is assembled.

In some embodiments, the fluid treatment apparatus comprises at least one of a clarifier and a thickener."

In some embodiments, said tank assembly has an upper portion and a lower portion and the divide between at least two tank sections is directed from said upper portion to said lower portion of said tank.

In some embodiments, the at least two tank sections are pivotally attached along the divide.

In some embodiments, the tank assembly further comprises a first support connected to the first tank section at a position spaced from the pivotal axis, and extending upwardly therefrom and coupled to a second support for supporting at least part of the weight of at least one of the tank sections.

According to one broad aspect, the invention provides a method of transporting a tank assembly comprising providing at least two tank sections wherein each tank section has a dimension that enables the section to be accommodated at or within a predetermined width limit for transportation by public road and wherein a dimension of the tank assembly directed across the sections when the tank assembly is assembled exceeds said predetermined width limit and orienting each tank section for transportation with the dimension that enables the section to be accommodated at or within a predetermined width limit directed across the width of the road.

According to one broad aspect, the invention provides a method of assembling a first tank section and a second tank section pivotally connected to each other by a pivotal connection, comprising providing support for supporting the first tank section, such that the second tank section is free to move relative to said first tank section about said pivotal axis, and rotating the second tank section about the pivotal connection to form an assembled tank with the first tank section.

BRIEF DESCRIPTION OF THE DRAWINGS

Preferred embodiments of the invention will now be described with reference to the attached drawings in which:

FIG. 4A is a perspective view of a pivoting hinge post assembly according to the embodiment of FIG. 1;

FIG. 4B is a perspective view of a stationary hinge post assembly according to the embodiment of FIG. 1;

DETAILED DESCRIPTION OF THE PREFERRED EMBODIMENTS

Figure 1:
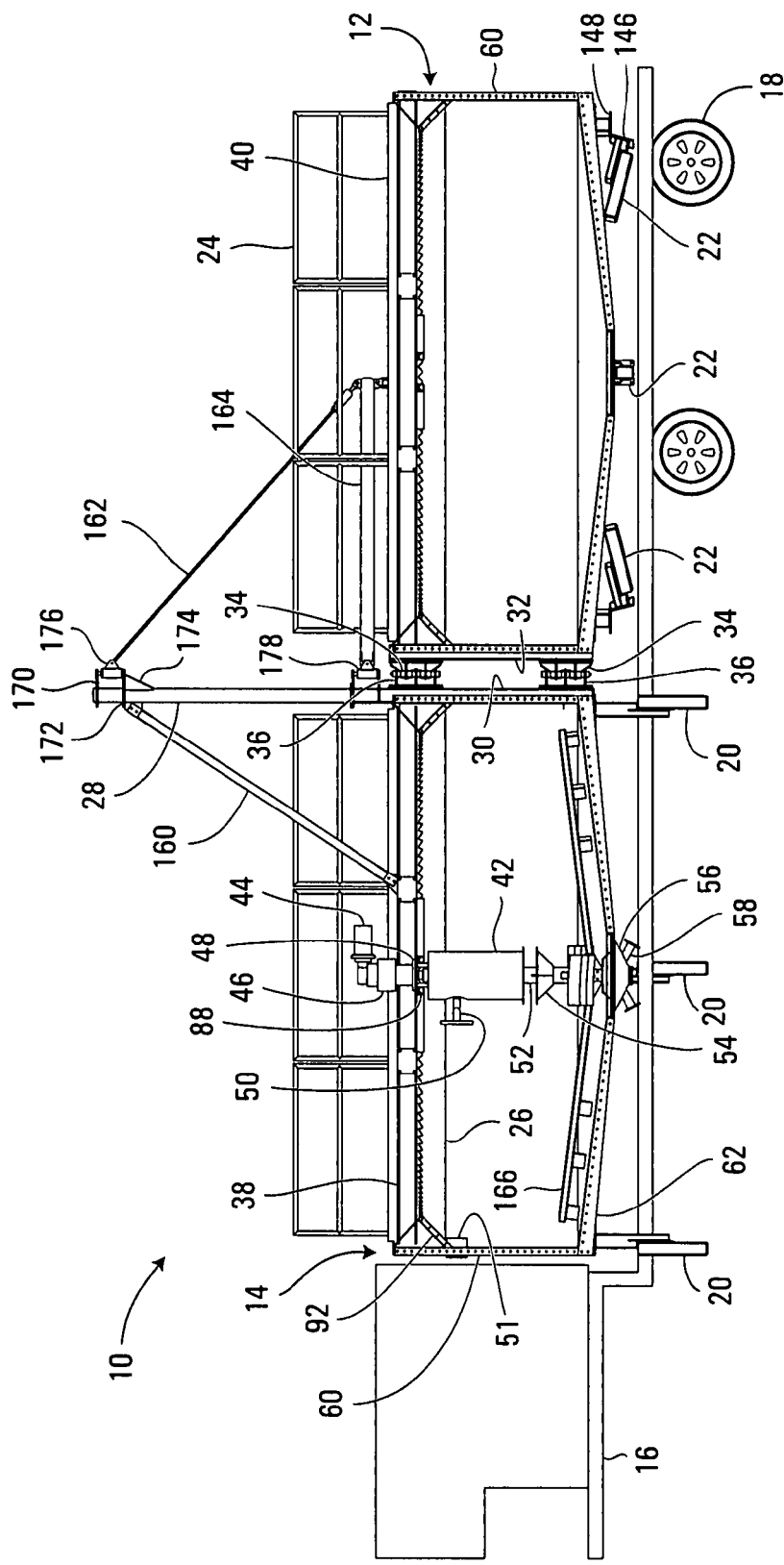
FIG. 1 is left side view of a portable tank apparatus according to an embodiment of the invention.

FIG. 1 shows a portable tank assembly 10 which includes a trailer deck 16, a stationary tank section 14 and a pivot tank section 12. Supporting trailer wheels 18 are provided on the trailer deck 16 and are located towards the rear of the trailer deck 16. The stationary tank section 14 rests on supports (not shown) on the trailer deck 16 towards the front of the trailer deck 16 and the pivot tank section 12 rests on supports (not shown) on the trailer deck 16 towards the rear of the trailer deck 16. The supports are constructed of hollow structural steel welded to the trailer deck 16 and support each of tank sections 12 and 14 at three points on the respective tank sections 12 and 14. The supports for the stationary tank section 14 are permanently welded, while the supports for the pivot tank section 12 are bolted to allow the pivot tank section 12 to pivot as required.

The pivot tank section 12 and the stationary tank section 14 are semi-cylindrical tank halves with vertical side walls, a semi-conical shaped bottom, an open face and an open top.

FIG. 1 shows an interior view of the tank sections 12 and 14. Vertical flanges 60 are provided on both tank sections 12 and 14. The vertical flanges 60 extend up the two vertical edges of the open face of each of the tank sections 12 and 14. The vertical flanges 60 extend outward from the vertical edges parallel to the open faces of the tank sections 12 and 14 and form opposed edges extending between an upper portion and a lower portion of the tank sections 12 and 14. The flanges 60 have a plurality of closely spaced bolt holes defined therethrough. Similarly, bottom flanges 62 are provided which extend outward from the edge of the semi-conical shaped bottom of the open face of the tank sections 12 and 14. The bottom flanges 62 extend parallel to the open faces of the tank sections 12 and 14. The flanges 60 and 62 define a divide between the two tank sections 12 and 14 when assembled. A plurality of bolt holes are also defined through the bottom flanges 62.

Both tank sections 12 and 14 include weir halves 26. The weir halves 26 are continuous pieces of sheet metal with serrated upper edges. Each of the weir halves 26 are welded to the tank sections 12 and 14. The weir halves 26 are positioned along an upper inner circumference of the wall of each of the tank sections 12 and 14. Each of the weir halves 26 is angled inward from the respective wall of tank sections 12 and 14 at an approximately 45 degree angle. The weir halves 26 are welded to the walls of tank sections 12 and 14 with a watertight seal. The weir halves 26 include weir flanges 92 located at the vertical edges of the weir halves 26. The weir flanges 92 extend inward parallel to the open faces of the tank sections 12 and 14. The weir flanges 92 also have a plurality of bolt holes defined therethrough.

Three stationary jack legs 20 are fixed to the bottom surface of the stationary tank section 14. The stationary jack legs 20 are spaced around the circumference of the stationary tank section 14. The stationary jack legs 20 overhang the edge of the trailer deck 16. The stationary jack legs 20 are shown in retracted position in FIG. 1.

Three pivot jack legs 22 are affixed to a bottom surface of the pivot tank section 12. The pivot jack legs 22 are spaced around the circumference of the pivot tank section 12. The pivot jack legs 22 are depicted in FIG. 1 in a retracted and folded position. In the folded position, the pivot jack legs 22 may rest on the trailer deck 16. The jack legs 20 and 22 are shown in more detail in FIGS. 5 and 6. The jack legs 20 and 22 provide retractable support for the tank sections 12 and 14.

The stationary tank section 14 includes a stationary cross member 38. The stationary cross member 38 extends laterally across the stationary tank section 14 adjacent an upper end of the open face of the stationary tank section 14. Similarly, the pivot tank section 12 includes a pivot cross member 40. The pivot cross member 40 extends laterally across the pivot tank section 12 adjacent an upper end of the open face of the pivot tank section 12. Six hand rails 24 are attached to the cross members 38 and 40. The hand rails 24 are bolted to the inner longitudinal sides of the cross members 38 and 40 opposite to the open face of the tank sections 12 and 14.

A drive assembly is supported by the cross member 38. The drive assembly consists of an electric motor 44, a gear reducer 46 and drive plate 48 at an upper end. The electric motor is connected to the gear reducer 46 which in turn is connected to the drive plate 48. The drive assembly also includes a drive pipe 52, a dispersion plate 54, a tube 42, an input pipe 50 and a rake assembly 166. The drive plate 48 is connected to the drive pipe 52 which extends down through a center of the tube 42. The dispersion plate 54 is connected to the tube 42 by four threaded rods (not shown). The rake assembly 166 is bolted to a lower end of the drive pipe 52. The input pipe 50 is connected to an outside pipe connection 51 by a flexible connection (not shown). The input pipe 50 extends out from an upper side of the tube 42. The input pipe 50 ends in a flange for easy connection to outside connection pipe connection 51. The means by which the drive assembly is supported is described in greater detail with respect to FIG. 3.

A bottom cone 56 is provided at a bottom point of the semi-conical shape bottom of the stationary tank section 14. Two output pipes 58 extend out from angled sides of the bottom cone 56. The output pipes 58 end with flanges for ready connection to associated piping and sludge pump (not shown).

The pivot tank section 12 is connected to the stationary tank section 14 by a loose hinge assembly. The hinge assembly includes hinge posts 30 and 32 and pairs of hinge plates 34 and 36. The pivot hinge post 32 is vertically oriented and bolted to the pivot tank section 12 by the frontward vertical flange 60 of the pivot tank section 12. The pivot hinge plates 34 are bolted to the pivot hinge post 32. The stationary hinge post 30 is vertically oriented and bolted to the stationary tank section 14 by the rearward vertical flange 60 of the stationary tank section 14. The stationary hinge plates 36 are bolted to the stationary hinge post 30. Each of the pairs of hinge plates 34 and 36 are bolted to opposite ends of the hinge posts 30 and 32. The hinge assembly is described in greater detail with reference to FIGS. 4A and 4B.

A mast assembly extends upward from the stationary hinge post 30. The mast assembly includes a mast 28, a cable 162, a mast support 160 and a mast arm 164. The mast 28 is a steel tube. The mast 28 has associated with it a mast upper top plate 170, a mast lower top plate 172, a plate angle support 174, an upper mast pivot 176 and a lower mast pivot 178.

The mast upper top plate 170 and the mast lower top plate 172 each have a protrusion with a hole defined therethrough. The mast upper top plate 170 and the mast lower top plate 172 are fastened at the top of the mast 28 with the mast lower top plate 172 spaced below the mast upper top plate 170. The holes in their protrusions are vertically aligned. The plate angle support 174 is a triangle plate welded between the mast 28 and the bottom of the protrusion of the mast lower top plate 172 for support.

The upper mast pivot 176 are cylindrical with an attachment flange extending from one side. A pin extends through the hole in the protrusion in the upper top plate 170 through the center of the upper mast pivot 176 and through the hole in the protrusion in the lower top plate 172.

The mast support 160 is a steel rod. The mast support 160 is angled between a rearward brace leg 82 (see FIG. 6) and an upper point of the mast 28. The mast support 160 is removably bolted at each end.

The mast arm 164 is a steel rod. The mast arm 164 is horizontal and is connected at one end to an intermediate point of a brace 74 (see FIG. 3) and at the other end to the lower mast pivot 178. The mast cable 162 connects the upper mast pivot 176 to the end of the mast arm 164 which connects to the brace 74 (see FIGS. 7 and 8).

The bottom end of the mast 28 is bolted to the top of a mast bearing support end flange 128 (see FIG. 4B).

Figure 2:
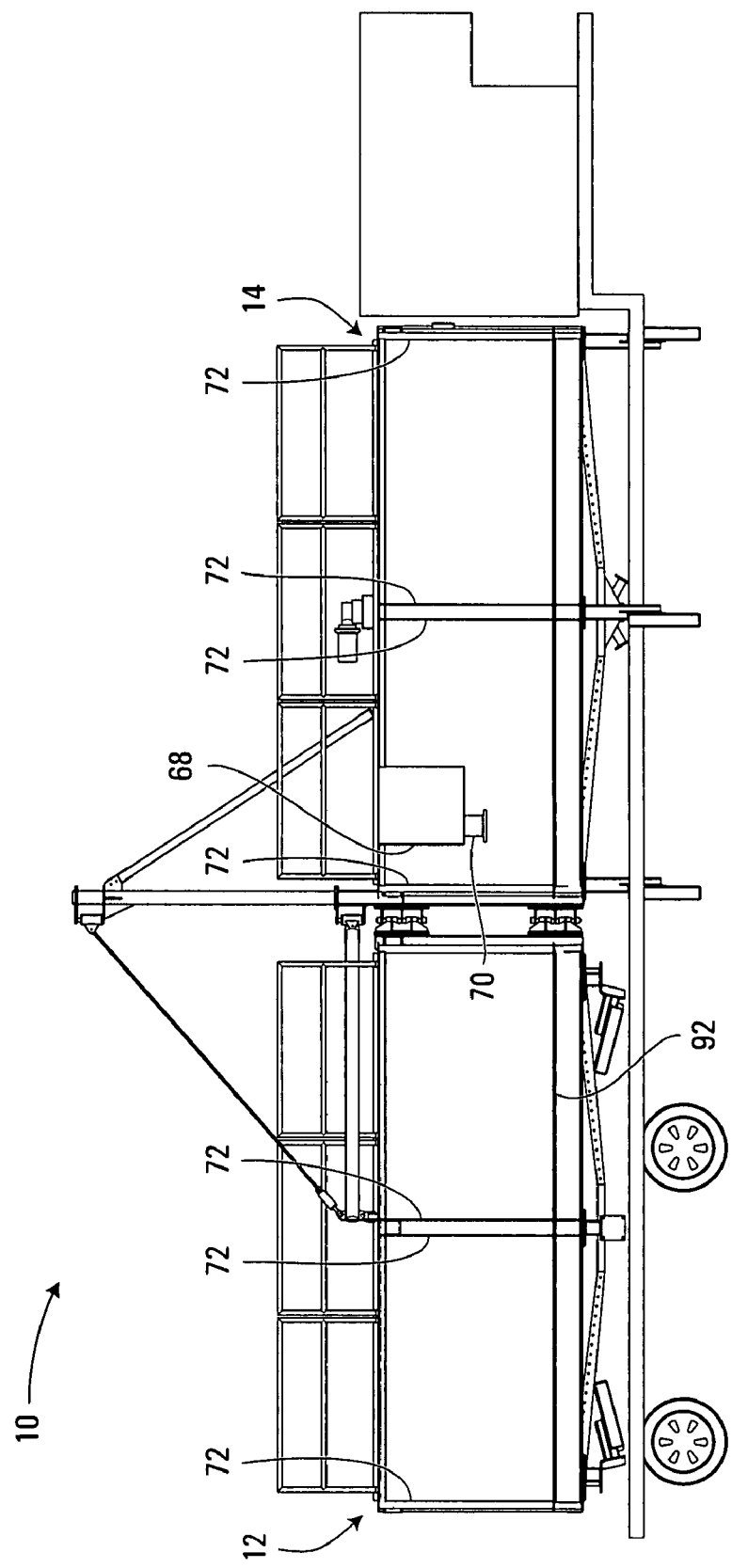
FIG. 2 is a right side view of the embodiment of FIG. 1.

FIG. 2 shows a rear view of the tank sections 12 and 14. The tank sections 12 and 14 include vertical stiffeners 72. The vertical stiffeners 72 are comprised of elongated flat pieces of metal. The vertical stiffeners 72 are welded to an outer surface of the walls of the tank sections 12 and 14 such that they extend vertically. The tank sections 12 and 14 also includes similar horizontally oriented stiffeners (not shown) on the bottom.

The stationary tank section 14 includes a discharge box 68 which is located adjacent the top rear of the stationary tank section 14. The discharge box 68 is hollow and open topped with a substantially triangular cross-section and a discharge pipe 70 extending from its bottom surface. The discharge pipe 70 ends in a flange for attachment to other piping of the assembly (not shown). The discharge box 68 communicates with the interior of the stationary tank section 14 through a hole in the wall of the stationary tank section 14 (not shown). The hole through the wall of stationary tank section 14 is defined above the weir half 26 of the stationary tank section 14. The discharge box 68 is welded to the rear surface of the stationary tank section 14 in a fluid tight manner.

Figure 3:
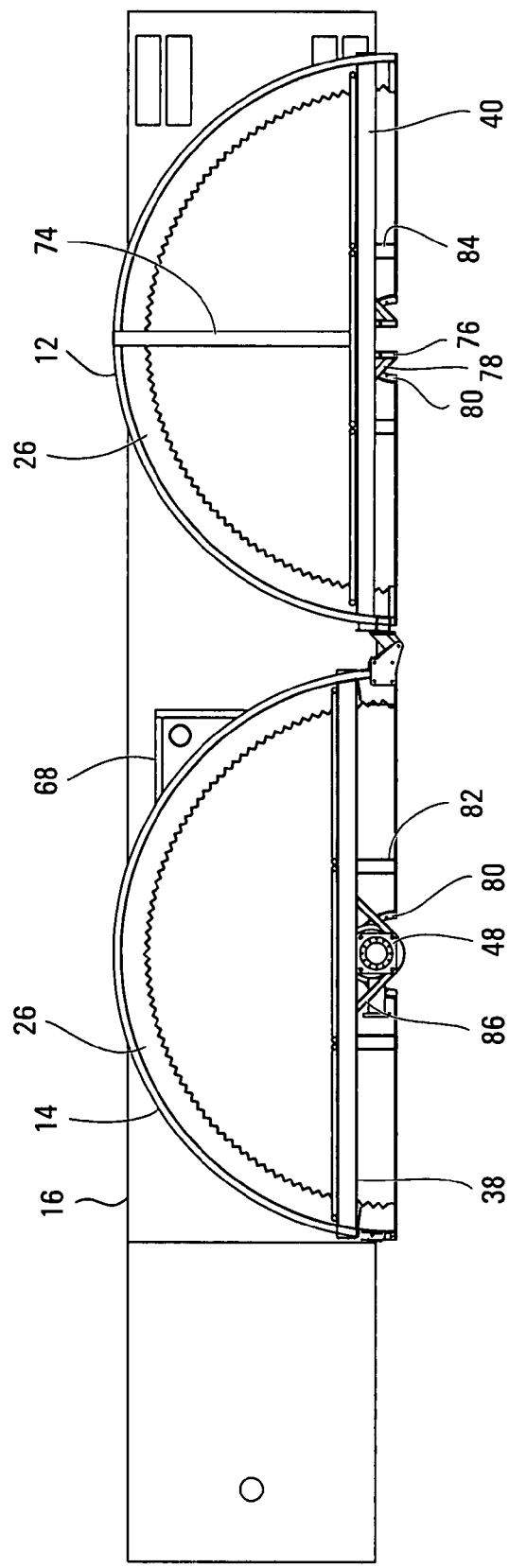
FIG. 3 is a top view of the embodiment of FIG. 1.

FIG. 3 shows the position of the tank sections 12 and 14 on the trailer deck 16. In particular, the tanks sections 12 and 14 take up substantially the entire length of the trailer 16 and slightly overhang the edges of the trailer 16. The weir halfs 26 extending around the circumference of the tanks sections 12 and 14 can be clearly seen in FIG. 3. The substantially triangular cross-sectional shape of discharge box 68 can also be clearly seen in FIG. 3.

FIG. 3 shows the support structure for the drive assembly. In particular, the pivot tank section 12 has drive supports 76 and angle braces 78. The drive supports 76 extend laterally from the bottom surface of the cross member 40 symmetrically spaced around a midpoint of the cross member 40. The drive supports 76 extend toward the open face of the pivot tank section 12. The angle braces 78 extend at an approximate 45 degree angle between the cross member 40 and an outer end of the drive supports 76. The drive supports 76 are spaced to fit under the drive plate 48. The drive assembly is shown in its transportation position such that it is not centered on the center line of the tank. In this position, the drive assembly is supported by the drive supports 88 of stationary tank section 14 alone. In operation mode the drive plate 48 is unbolted from the drive supports 88 and shifted and bolted on both the drive supports 88 and the drive supports 76 present on both tank sections 12 and 14 and centered along the centerline of the assembled tank.

The cross member 40 also includes brace legs 84. The brace legs 84 extend laterally from the open face side of the cross member 40 and terminate in flanges at the open face of the pivot tank section 12. The brace 74 is provided in the pivot tank section 12. The brace 74 extends horizontally between a centre point of the cross member 40 and the outer surface of the tank. The brace 74 is a beam which helps prevent deformation of the pivot tank section 12 during rotation.

The stationary tank section 14 also include drive supports 88 (see FIG. 6) and angle braces 86 which provide support for the drive assembly. The drive supports 88 extend outwardly from the cross member 38 under the drive plate 48. The angle braces 86 extend at an approximately 45 degree angle between the cross member 38 and ends of the drive supports 88.

The cross member 38 also includes brace legs 82. The brace legs 82 are spaced along the cross brace 38 and extend outwardly therefrom. The brace legs 82 terminate in flanges at the open face of the stationary tank section 14. The brace legs 82 are positioned to mate with leg braces 84 when the tank is in a closed position.

Also visible in FIG. 3 are cone bottom flanges 80 of the tank sections 12 and 14 which have a plurality of bolt holes defined therethrough. Cone bottom flanges are horizontal and connect the bottom cone 56 to the tank sections 12 and 14 when assembled.

FIGS. 4A and 4B show details of the hinge posts 30 and 32 and the hinge plates 34 and 36. Turning to FIG. 4A, FIG. 4A shows the pivot hinge post 32. The pivot hinge post 32 is an elongated hollow steel post with a square cross section. Also depicted are two hinge base plates 104. Each of the hinge base plates 104 is a flat rectangular plate with six bolt holes defined around the perimeter. A first hinge base plate 104 is welded at an upper end of the pivot hinge post 32 and a second hinge base plate 104 is welded at the bottom end of the pivot hinge post 32. Defined in the opposite face of the pivot hinge post 32 from the hinge base plates 104 is an upper rim opening 100 and a lower rim opening 102. The upper rim opening 100 is located adjacent the top of the pivot hinge post 32 and accommodates a top side rim 98 (FIG. 5) of the pivot tank section 12 when the pivot hinge post 32 is bolted to the pivot tank section 12. Similarly, the lower rim opening 102 accommodates a bottom side rim 96 (FIG. 5) of the pivot tank section 12 when the pivot hinge post 32 is bolted to the pivot tank section 12.

Two rotating hinge support plates 110 extend outwardly from the pivot hinge plate 34. The rotating hinge support plates 110 are perpendicular to the pivot hinge plate 34. A rotating hinge 106 extends through and is connected to the outer end of each rotating hinge support plate 110. A pivot hinge web plate 108 is provided which extends between the two rotating hinge support plates 110. Also provided are two pivot hinge gussets 112 which connect from the rotating hinge support plate 110 to the pivot hinge plate 34. The pivot hinge web plate 108 and the pivot hinge gussets 112 further support the hinge assembly. The entire hinge assembly structure may be welded together or may be cast as a single part. The pivot hinge plate 34 has six bolt holes defined therethrough which match to the bolt holes in the hinge base plate 104 to allow each pivot hinge plate 34 to be bolted to one of the hinge base plate 104.

Turning to FIG. 4B, FIG. 4B shows the stationary hinge post 30 which is also an elongated steel hollow post having a square cross section. A series of bolt holes 190 are defined up a side face of the stationary hinge post 30 to enable bolting of the stationary hinge post 30 to the rearward vertical flange 60 of the stationary tank section 14. A lower rim opening 124 is defined adjacent a lower end of one face of the stationary hinge post 30. The lower rim opening 124 is shaped to accommodate the bottom side rim 196 (see FIG. 6) of the stationary tank section 14. Similarly, adjacent an upper end of the stationary hinge post 30, there is defined an upper rim opening 122 which is sized to accommodate the top side rim 198 (see FIG. 6) of the stationary tank section 14 such that the stationary hinge post 30 can be bolted flush against the exterior side of the stationary tank section 14.

The stationary hinge assembly includes hinge base plates 120 and stationary hinge plates 36. The hinge base plates 120 are located on an opposite face of the stationary hinge post 30 from the openings 122 and 124. There are two hinge base plates 120, one adjacent the lower end of the stationary hinge post 30 and the other adjacent the upper end of the stationary hinge post 30. The flat steel hinge base plates 120 have four holes spaced along each of their vertical edges to accommodate attachment of the stationary hinge plates 36.

The stationary hinge plates 36 have four holes defined on each of the vertical edges which align with the holes of the hinge base plates 120 to allow bolting together of the stationary hinge plate 36 and the hinge base plates 120. Three stationary hinge support plates 118 extending laterally outwardly from the hinge base plates 36. A stationary hinge 114 is located at an outer end of each of the stationary support plates 118. The stationary hinges 114 are cylindrical and in vertical alignment but spaced apart to accommodate the rotating hinges 106 of the pivot hinge plate 34 when assembled. Two stationary hinge web plates 116 connect pairs of the stationary hinge support plates 118. The hinge assembly can be cast as a single part or have component parts welded together.

The mast bearing support end flange 128 and a mast bearing support 126 are also provided. The mast bearing support end flange 128 is substantially a square flat plate with protrusion extending from one corner. There are bolt holes defined through the four corners of the square portion to allow bolting of the mast 28 to the mast bearing support end flange 128. There is also a hole defined through the outer end of the protrusion. The mast bearing support 126 has the same shape as the protrusion of the mast bearing support end flange 128. A mast bearing support end flange 128 is positioned atop the stationary hinge post 30. The mast bearing support 126 is positioned directly in a vertical alignment below the mast bearing support end flange 128 and above the upper stationary hinge plate 36. The mast bearing support 126 also has a hole defined through it at an extent which is in alignment with the hole defined through the end of the protrusion of the mast bearing support end flange 128. The mast bearing support 126 and the protrusion of the mast bearing support end flange 128 extend outwardly laterally from a corner from the stationary hinge support 30 over the stationary hinge plates 36. A cylindrical lower mast pivot 178 (see FIG. 1) is provided with an attachment flange extending from one side. The mast bearing support 126 and the mast bearing support end flange 128 support an end of the mast arm 164 (see FIG. 1) through the lower mast pivot 178.

Figure 5:
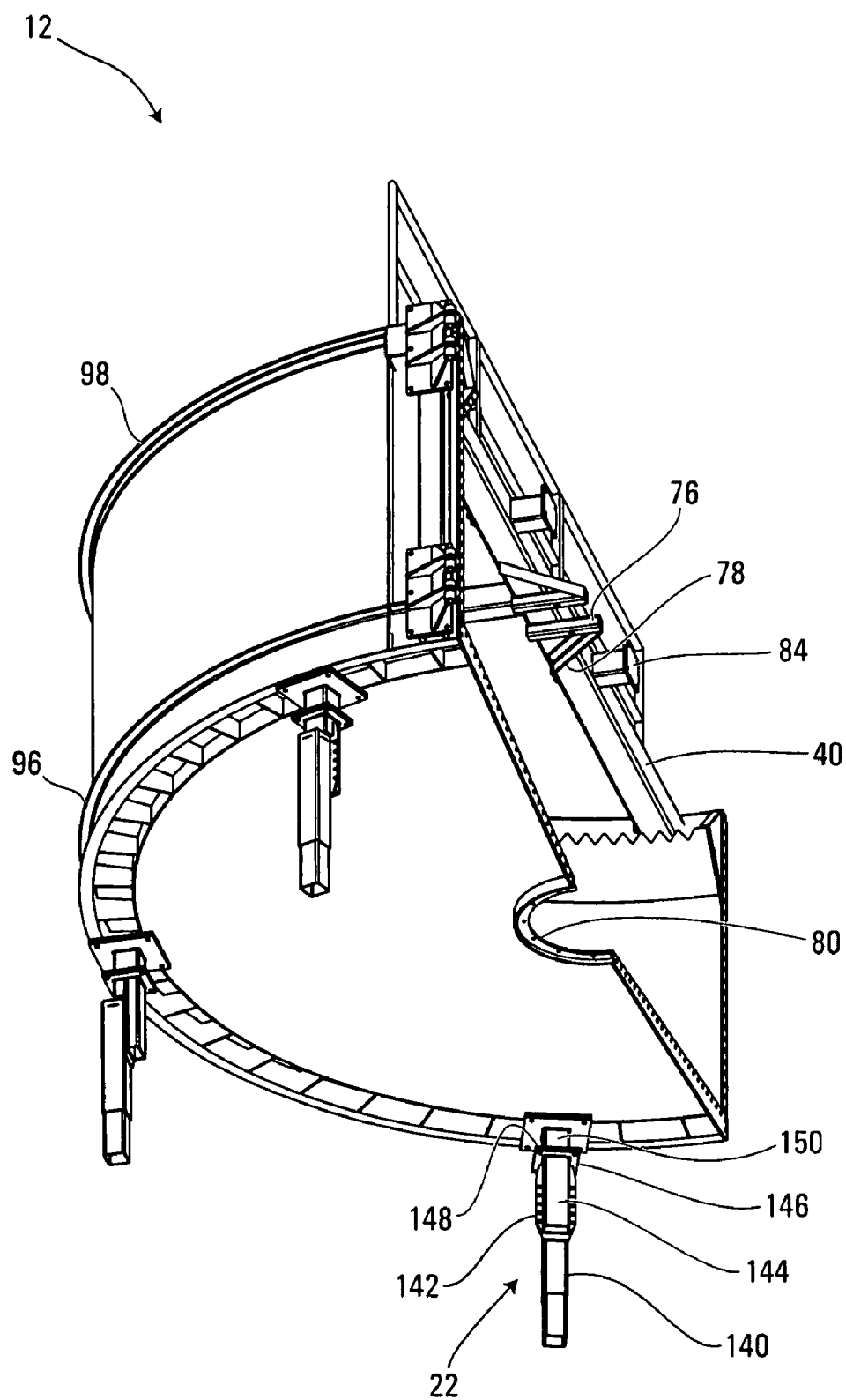
FIG. 5 is a bottom perspective view of a pivot tank section according to the embodiment of FIG. 1.

FIG. 5 shows bottom details of the pivot tank section 12. In particular, the connection of the brace legs 84, the drive supports 76, and the angle braces 78 to the cross member 40 can be more clearly seen. The drive supports 76 and the angle braces 78 extend along a bottom of the cross member 40 and are fastened thereto by welding or bolting.

The pivot jack legs 22 can also be seen in more detail in FIG. 5. In particular, the pivot jack legs 22 each comprise a pivot leg bottom 140 a pivot leg top 144, a jack connection 142, and a leg post 150. The pivot leg bottoms 140 and the pivot leg tops 144 are connected by the jack connections 142. A leg support plate 146 is provided at the top of each pivot leg top 144. Each leg support plate 146 is a flat square plate which is perpendicular to the direction of the leg 22 and overhangs the sides of the pivot leg top 144. Defined in each of the four corners of the leg support plates 146 are bolt holes.

FIG. 5 also shows leg base plates 148 which are flat square plates with bolt holes defined in the four corners which mirror the bolt holes of the leg support plates 146. The leg base plates 148 are located at the lower end of the leg posts 150 which are permanently fixed to the bottom of the pivot tank section 12. The leg base plates 148 and the leg support plates 146 are hinged along one edge (see FIG. 1). In FIG. 1, the legs 22 are shown in a folded position. In FIG. 5, the legs 22 are shown in their use position in which legs 22 are rotated about the hinge between the leg support plates 146 and the leg base plates 148 to be brought into the vertical position. The leg 22 is then retained in this position by bolting together the leg support plates 146 and the leg base plates 148.

Figure 6:
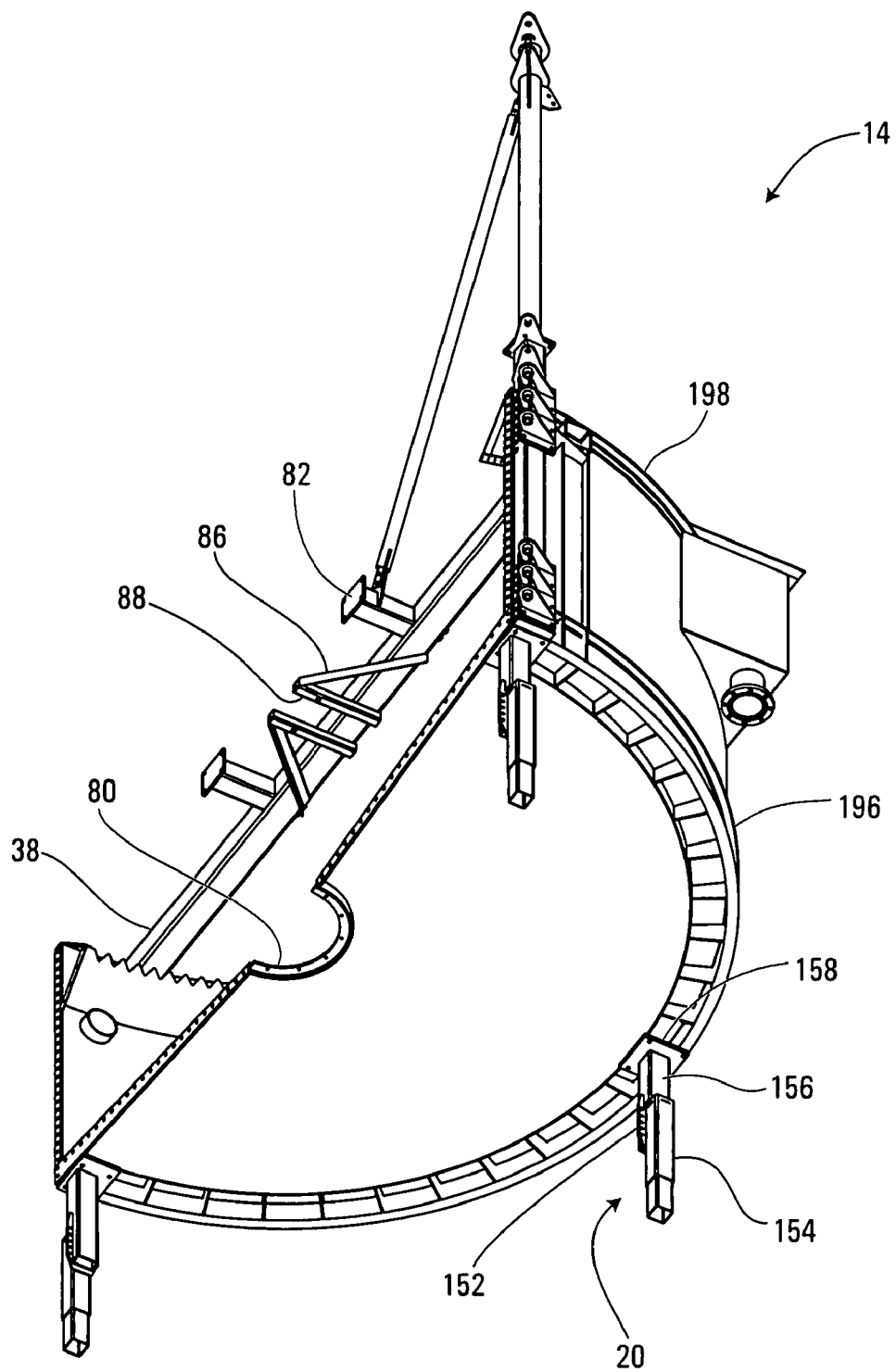
FIG. 6 is a bottom perspective view of a stationary tank section according to the embodiment of FIG. 1.

FIG. 6 shows the bottom details of the stationary tank section 14. As with FIG. 5, FIG. 6 shows how the drive supports 88, the angle braces 86 and the brace legs 82 are connected to the cross brace 38. In particular, the drive supports 88 and the angle braces 86 extend across a bottom surface of the cross member 38 and are bolted or welded thereto.

FIG. 6 also shows the stationary jack legs 20. The stationary jack legs 20 are comprised of stationary leg tops 156, stationary leg bottoms 154 and jack connectors 152. The stationary leg tops 156 and the stationary leg bottoms 154 are square steel legs. The stationary leg top 156 and the stationary leg bottom 154 are connected by the jack connection 152. The stationary leg tops 156 terminate at their upper ends with leg base plates 158. Each leg base plate 158 has bolt holes defined through each of its four corners for attachment to the bottom of the stationary tank section 14.

Figure 7:
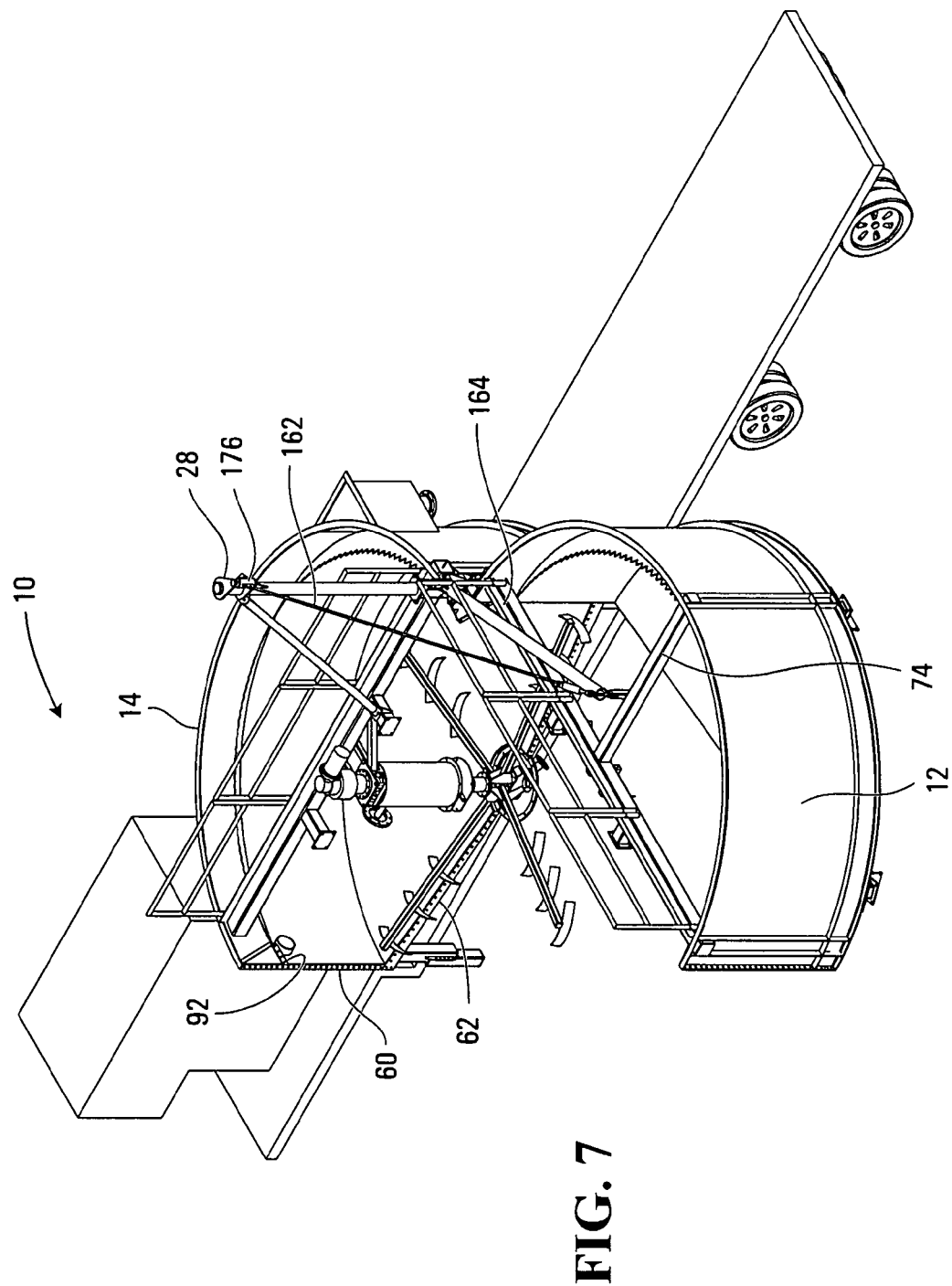
FIG. 7 is a perspective view of the embodiment of FIG. 1 with the pivot tank section in a partially rotated position.

The portable tank assembly 10 is transported in the position depicted in FIGS. 1, 2 and 3 with the exception that the mast 28 is normally lowered for transportation. In particular, the mast support 160, the mast 28 and the mast cable 162 are removed for transportation. The hand rails 24, bottom cone 56 and one rake arm of the rake assembly 166 that extends beyond the footprint of the trailer deck 16 are removed. FIG. 7 shows the one arm that needs to be removed during transport.

Figure 8:
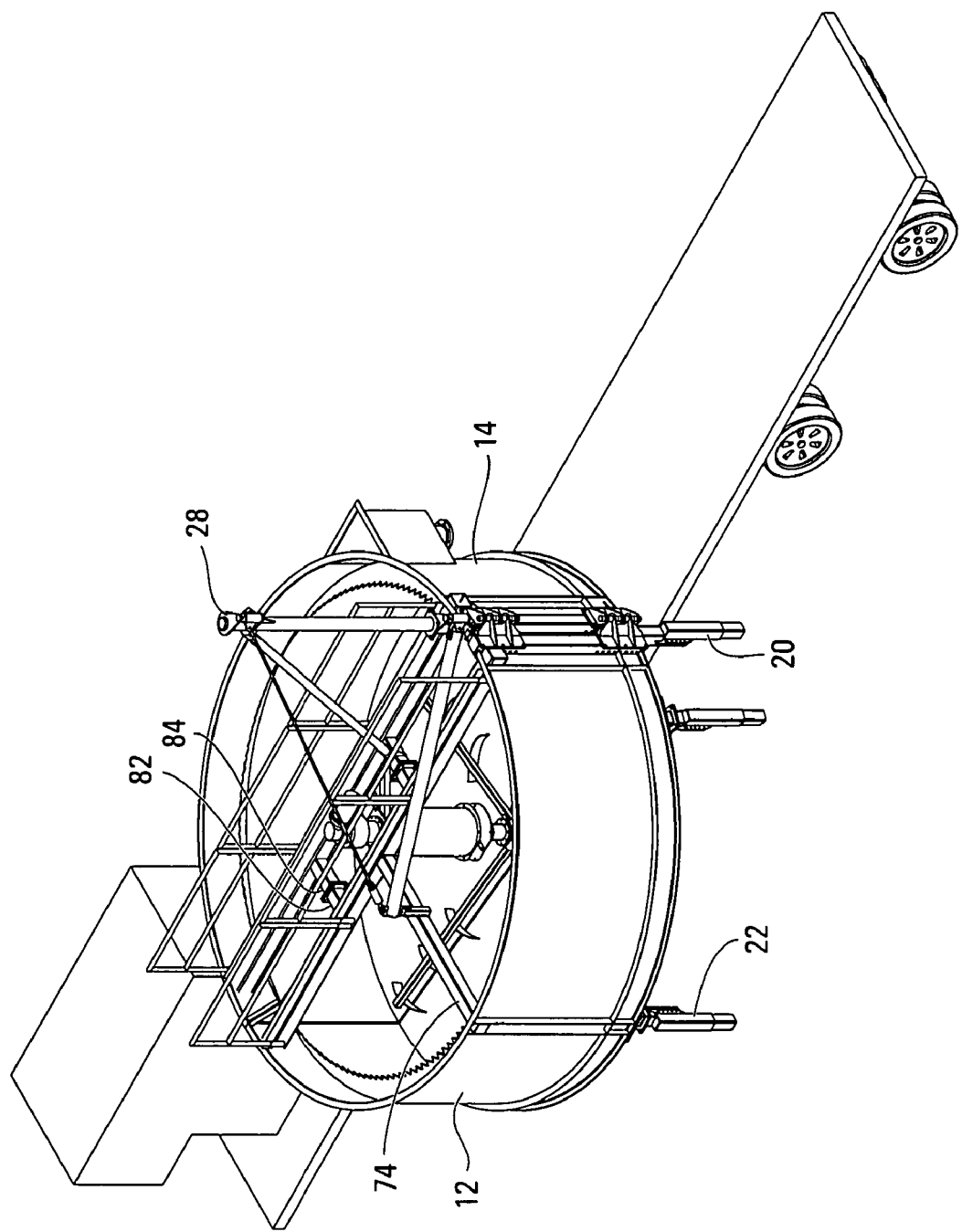
FIG. 8 is a perspective view of the embodiment of FIG. 1 with the pivot tank section in a closed position.

The trailer deck 16 is connected to a transport truck and towed to the location where the portable assembly 10 is to be used. In this configuration, the width of the assembly tank sections 12 and 14 across the width of the road is within a predetermined width limit for transportation without a permit or for transportation using the desired permit level (i.e. acceptable cost and restrictions). Once at the location for use, the pivot tank section 12 is prepared to be rotated to align with the stationary tank section as shown in FIGS. 7 and 8. The mast 28 is positioned vertically and bolted to the top of the mast bearing support end flange 128. The mast cable 162 is attached from the upper mast pivot 176 at the top of the mast 28 to an outside corner of the mast arm 164. The mast assembly provides support to the pivot tank section 12 during rotation. The bottom cone 56 is attached to the stationary tank section 14 and the rake arm that extends beyond the trailer footprint is attached (FIG. 7). A gasket (not shown) is placed between the flanges 60, 62 and 92 of the two tank sections 12 and 14 and between the bottom cone 56 and the flanges 80 of the two tank sections 12 and 14. The pivot tank section 12 rotates about the hinges 106 and 114, which in use, have a pin extending therethrough to connect the hinges 106 and 114. The pivot tank 12 is rotated through the position shown in FIG. 7 to the position shown in FIG. 8. At this point, bolts are inserted in all of the bolt holes in the flanges 60, 62, 92 and 80 to fasten the two tank halves together in a liquid tight manner to hold liquid. Flanges at the ends of the brace legs 82 and 84 are fastened. The stationary jack legs 22 are jacked down to provide support. The pivot jack legs 20 are also positioned to provide support by first unfolding the jack legs to the vertical position and bolting the leg supports 146 to the leg base plates 148 (see FIG. 5). The pivot leg bottoms 140 are then jacked down to provide support for the pivot tank section 12. Next, the hand rails are installed and a fiberglass walkway (not shown) is positioned between the hand rails 24 and rests on the cross members 38 and 40 to provide access for an operator to walk to the drive assembly. The motor, gear reducer, tube and drive pipe and drive plate assembly is shifted to operation mode.

Connections are then made to the various pipes to allow operation of a clarifier/thickener system utilizing the portable tank assembly 10. In particular, a pipe is connected to input pipe 50 to pump the fluid to be treated into the assembled portable tank assembly 10. In operation, the dispersion plate 54 acts to evenly spread the incoming slurry across the bottom of the assembled tank. The slurry enters in through the input pipe 50 flows down through the tube 42 and is evenly spread through the circumference of the tank by the dispersion plate 54. The threaded rods allow the adjustment of the gap between the dispersion plate 54 and the tube 42 to allow for different flow rates. The connection of the drive pipe 52 to the rake assembly 166 connects the rake assembly 166 to the gear reducer 46 and motor 44. The rake moves at a rate around 3 rpm at the rake tips and functions to "pull" the thickened sludge to the center of the tank at the point of the bottom cone so that it can be continuously pumped from the tank. The drive unit is actuated to drive the drive assembly. The rake assembly 166 rakes in a circular motion around the bottom of the tank for sludge treatment. Slurry is drained out of the bottom of the tank through bottom output pipes 58. Clarified water spills over the weir 26 and exits the tank through the discharge box 68. The operation of the clarifier/thickener system is conducted in a manner known in the art.

In the operation configuration, the width of the assembly tank sections 12 and 14 across the width of the road exceeds the predetermined width limit.

Although a specific embodiment of the invention has been explained, it will be evident to those skilled in the art that modifications can be made within the scope of the invention. For example, forms of legs other than jack legs and folding legs can be used. The legs could alternatively be transported separately and installed at the worksite. Hydraulic legs may also be used.

With respect to the hinge, any sufficiently durable pivot means known in the art could be used. With respect to pivoting the tank section 12 into position, means other than the mast assembly shown could be used to support the pivot tank section 12. For example, pivot section 12 could be supported manually from the bottom.

Other drive systems with or without rake systems could be used for the clarifier/thickener system. Additionally, this tank can be used in other applications, including other fluid treatment applications, and apparatuses outside of the field of clarifier/thickener systems. Other rotary devices may also be used. The tank may be used for a clarifier or thickener system alone, rather than for both.

The portable tank assembly is preferably all steel construction but other materials of acceptable strength and durability can be substituted. Welding and bolting of the steel section has been described. Other attachment means can, of course, be alternatively use.

Although the invention is disclosed as having two equal semi-cylindrical sections, it will be understood other tank shapes and unequal division of the tank into two or more sections is contemplated by the invention.

The invention claimed is:

1. A tank assembly comprising:
a plurality of tank sections;
a frame and wheels supporting the tank sections;
each tank section capable of being connected to at least one other tank section, wherein each tank section has a dimension that enables the section to be accommodated at or within a predetermined width limit for transportation by public road, and wherein, when the tank assembly is assembled, a dimension of the tank directed across a transportation direction of the sections and a dimension of the tank directed along the transportation direction of the sections both exceed the predetermined width limit; and a fluid treatment apparatus capable of being mounted within the tank assembly when the tank assembly is assembled, wherein the frame and wheels are configured to support the tank sections during transportation and at least one tank section when the tank assembly is assembled.

2. The tank assembly as claimed in claim 1, further comprising a plurality of retractable downward supports for supporting the assembled tank.

3. A tank assembly comprising;
a plurality of tank sections each capable of being connected to at least one other tank section;
a frame and wheels configured to support the plurality of tank sections during transportation and at least one tank section when the tank assembly is assembled; and
a fluid treatment apparatus capable of being mounted within the tank assembly when the tank assembly is assembled.

4. The tank assembly as claimed in claim 3, wherein said tank when assembled is substantially cylindrical.

5. The tank assembly as claimed in claim 3, wherein the plurality or tank sections comprise two substantially uniform semi-cylindrical halves.

6. The tank assembly as claimed in claim 3, wherein said dimension of the tank directed across the sections is 11 feet or more.

7. The tank assembly as claimed in claim 3, further comprising mounting means for mounting the fluid treatment apparatus therein.

8. The tank assembly as claimed in claim 3, wherein the fluid treatment apparatus comprises at least one of a clarifier and a thickener.

9. The tank assembly as claimed in claim 3, wherein said tank assembly has an upper portion and a lower portion and the a divide between at least two tank sections is directed from said upper portion to said lower portion of said tank.

10. The tank assembly as claimed in claim 9, wherein the at least two tank sections are pivotally attached along the divide.

11. The tank assembly as claimed in claim 10, further comprising a first support connected to the first tank section at a position spaced from the pivotal axis, and extending upwardly therefrom and coupled to a second support for supporting at least part of the weight of at least one of the tank sections.

12. A method of transporting a tank assembly comprising:
providing at least two tank sections, a frame and wheels supporting the tank sections, and a fluid treatment apparatus capable of being mounted within the tank assembly when the tank assembly is assembled, wherein each tank section has a dimension that enables the section to be accommodated at or within a predetermined width limit for transportation by public road and wherein, when the tank assembly is assembled, a dimension of the tank assembly directed across a transportation direction of the sections and a dimension of the tank assembly directed along the transportation direction both exceed said predetermined width limit; and orienting each tank section for transportation with the dimension that enables the section to be accommodated at or within a predetermined width limit directed across the width of the road;

wherein the frame and wheels are configured to support the tank sections during transportation and at least one tank section when the tank assembly is assembled.

13. A method of assembling a portable tank assembly comprising a first tank section and a second tank section pivotally connected to each other by a pivotal connection and a frame and wheels configured to support the first and second tank sections during transportation and at least one tank section when the portable tank assembly is being assembled, comprising:

supporting the first tank section with the frame and wheels, such that the second tank section is free to move relative to said first tank section about said pivotal connection; and rotating the second tank section about the pivotal connection to form an assembled tank with the first tank section;

mounting a fluid treatment apparatus within the tank assembly when the tank assembly is assembled.

14. A tank assembly comprising:
a plurality of tank sections;
a frame and wheels supporting the tank sections;
each tank section capable of being connected to at least one other tank section, wherein each tank section has a dimension that enables the section to be accommodated at or within a predetermined width limit for transportation by public road, and wherein, when the tank assembly is assembled, a dimension of the tank directed across a transportation direction of the sections and a dimension of the tank directed along the transportation direction of the sections both exceed the predetermined width limit;
a fluid treatment apparatus capable of being mounted within the tank assembly when the tank assembly is assembled; and
a plurality of retractable downward supports for supporting the assembled tank.

15. A tank assembly comprising:
a plurality of tank sections each capable of being connected to at least one other tank section;
a fluid treatment apparatus capable of being mounted within the tank assembly when the tank assembly is assembled;
wherein said tank assembly has an upper portion and a lower portion and a divide between at least two tank sections is directed from said upper portion to said lower portion of said tank;
wherein the at least two tank sections are pivotally attached along the divide; and
a first support connected to the first tank section at a position spaced from the pivotal axis, and extending upwardly therefrom and coupled to a second support for supporting at least part of the weight of at least one of the tank sections.

* * * * *

UNITED STATES PATENT AND TRADEMARK OFFICE
CERTIFICATE OF CORRECTION

| | | |
|---|---|---|
| PATENT NO. | : 7,462,281 B2 | Page 1 of 1 |
| APPLICATION NO. | : 11/973186 | |
| DATED | : December 9, 2008 | |
| INVENTOR(S) | : Glenn Clark and Colin Morrell | |

It is certified that error appears in the above-identified patent and that said Letters Patent is hereby corrected as shown below:

<u>Column 11</u>

Claim 9; line 38 "the a divide" should be "a divide".

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,462,281 B2
APPLICATION NO. : 11/973186
DATED : December 9, 2008
INVENTOR(S) : Glenn Clark and Colin Morrell It is certified that error appears in the above-identified patent and that said Letters Patent is hereby corrected as shown below:

Column 11

Claim 5; line 25 "or" should be "of".

Signed and Sealed this

Second Day of March, 2010

David J. Kappos
*Director of the United States Patent and Trademark Office*